United States Patent [19]

Gross

[11] Patent Number: 5,172,817
[45] Date of Patent: Dec. 22, 1992

[54] RACK FOR COMPACT DISKS OR TAPE CASSETTES

[76] Inventor: Jan S. Gross, 4903 San Jose St., Tampa, Fla. 33629

[21] Appl. No.: 809,384

[22] Filed: Dec. 16, 1991

Related U.S. Application Data

[63] Continuation-in-part of Ser. No. 637,778, Jan. 7, 1991, Pat. No. 5,072,836.

[51] Int. Cl.$^5$ ............................................. A47B 63/00
[52] U.S. Cl. .................................... 211/40; 211/182
[58] Field of Search .................... 211/40, 182, 41, 88; 40/124, 124.2, 124.4, 152, 605; 248/205.2

[56]    References Cited

U.S. PATENT DOCUMENTS

| 118,380 | 8/1871 | Monroe | 40/124 X |
| 3,337,059 | 8/1967 | Le Hoy | 211/86 |
| 3,541,322 | 11/1970 | Bennett | 211/182 X |
| 3,773,183 | 11/1973 | Johnson | 211/71 |
| 3,908,830 | 9/1975 | Skrzelowski | 211/55 |
| 4,102,458 | 7/1978 | Fors | 211/40 X |
| 4,132,311 | 1/1979 | Glinert | 206/837 |
| 4,254,880 | 3/1981 | Mangel | 211/41 |
| 4,290,530 | 9/1981 | Wooster | 40/152 X |
| 4,403,697 | 9/1983 | Forshee | 211/13 |
| 4,477,990 | 10/1984 | Buchanan | 40/152 X |
| 4,497,125 | 2/1985 | Hutchinson | 40/124 X |
| 4,645,075 | 2/1987 | Van der Lely | 206/387 |
| 4,756,119 | 7/1988 | Chabot | 47/39 |
| 4,840,339 | 6/1989 | Grogan | 248/205.2 |
| 4,919,287 | 4/1990 | Haskett et al. | 211/41 |
| 4,940,147 | 7/1990 | Hunt | 248/205.2 X |
| 4,951,826 | 8/1990 | Tompkins | 248/205.2 X |
| 4,986,013 | 1/1991 | Pollock | 40/152 |

Primary Examiner—Alvin C. Chin-Shue
Assistant Examiner—Sarah A. Lechok
Attorney, Agent, or Firm—James H. Beusse

[57]    ABSTRACT

A wall mountable free-standing storage rack for compacts disks comprises an open framework forming a plurality of adjacent rectangular receptacles, each being sized to accept a compact disk when the disk is oriented with one of the disk's largest surfaces facing outward of the rack. At least one releasible latch is integrated into each of the receptacles for releasible retaining a disk therein. Each of the rectangular receptacles is formed from four elongated side members releasible joined to four corner members. Preselected ones of the corner members are connectable to other elongated side members for forming the adjacent receptacles. The corner members also include a pin and socket arrangement on a rear surface for attaching a mount to an assembled rack. The rack may be wall releasibly mounted using the mount in one form or be coupled to other racks in various angular orientations using the mount in other forms.

11 Claims, 3 Drawing Sheets

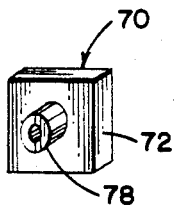
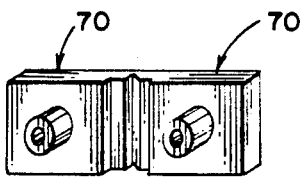
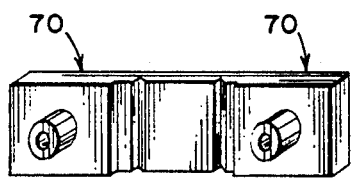
FIG. 9A    FIG. 10A    FIG. 11A
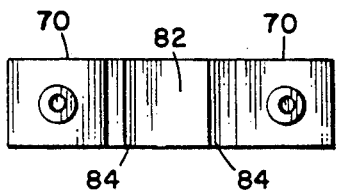
FIG. 9B    FIG. 10B    FIG. 11B
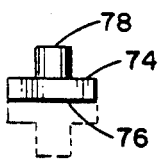
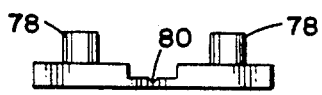
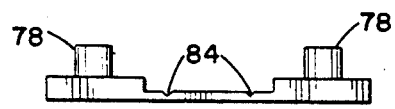
FIG. 9C    FIG. 10C    FIG. 11C
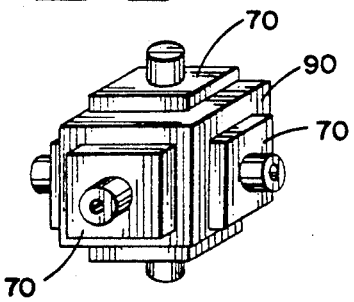
FIG. 12A
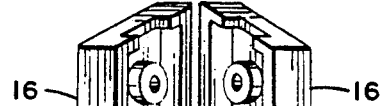
FIG. 13
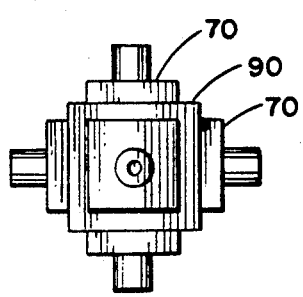
FIG. 12B

RACK FOR COMPACT DISKS OR TAPE CASSETTES

This is a continuation-in-part of application Ser. No. 07/637,778 filed Jan. 7, 1991 now U.S. Pat. No. 5,072,836.

BACKGROUND OF THE INVENTION

The present invention relates to storage racks for music media cases and, more particularly, to storage racks which can be arranged for holding such media cases in a display arrangement with the largest surfaces of the cases facing outward.

Music media, such as compacts disks or magnetically encoded audio tapes, are generally packaged in a plastic case adapted to provide some degree of protection to the media. The cases are generally rectangular on all surfaces and have relatively thin edges. The predominate identification of the enclosed media appears on the larger surfaces of the cases rather than the narrower edges. For the relatively thin compacts disks, the edge identification is both limited and relatively small due to the thickness of the disk and its case.

Notwithstanding the limited edge labeling of music media cases, it has been the general practice to provide storage racks which stack the cases in an edge viewable orientation. While such storage racks serve to reduce storage space for media cases, they also serve to increase the difficulty of identifying particular media selections and conceal the primary descriptive material on the larger surfaces of the media cases. It would be desirable to provide a music media storage rack which overcomes the above disadvantages of the prior racks.

It is also common in the music industry to provide interesting and attractive faces on the media cases as part of the marketing of the underlying media. It is therefore further desirable to provide media storage racks which allow the cases of the media cases to be visible. Since such storage racks which display faces of music media may become relatively small depending upon the number of cases to be displayed, it is also desirable to provide a storage rack which can be adjusted to any selectable size by adding or deleting storage space.

SUMMARY OF THE INVENTION

The above and other objects, features, and advantages are in part apparent and in part illustrated in the disclosed embodiment. In general, the present invention comprises an apparatus for storage of music media cases such that a large face of each case is visible. In an illustrative form, the apparatus comprises a storage rack formed from a plurality of elongated members joined together by a plurality of corner members. The corner members may comprise a right angle corner, a T-shaped double corner, or a cross-shaped quadruple corner. The right angle corner forms a corner termination, the T-shaped corner is used at an edge termination while the cross-shaped corner forms an interior corner for four adjacent storage receptacles. The elongated members are releasibly connectable at each end thereof to one of the above described corner members. Four elongated members are connectable with four corners to form a single receptacle for receiving a media case. The size or length of the elongated member is selected to match the type of media to be stored, e.g., compact disk or magnetic tape. A particular corner member is selected depending upon whether the storage rack is to be extended to additional receptacles or terminated.

The storage rack ma be formed of multiple receptacles arranged in a selected manner to form various shaped racks, for example, rectangular, L-shaped, T-shaped, cross-shaped, or U-shaped. The assembled rack may be hung on a wall or joined at an edge with another angularly oriented rack to become self-supporting. In a preferred form, the elongated members are provided with pins which snap into mating apertures in the corner members. The corner members and elongated members are suitably shaped to provide a continuous smooth edge around each receptacle when in an assembled condition. Each of the corner members includes an integral formed latching means for releasibly holding a media case inserted into a corresponding receptacle. Each corner member is also formed with a flange to prevent the media case from being pressed out the back side of the formed receptacles.

The present invention also includes a plurality of mounting members for releasibly attaching the racks to either a wall surface or into free-standing combinations. In one form, the mounting members comprise a plate-like member having a protrusion extending from one side which snaps into mating apertures in the corner members. The mounting members may be adhesively attached to a flat mounting surface allowing the racks to be supported on the mounting members while being releasible removable from them by simply pulling away from the protrusions and separating connection at the apertures in the corner members. The mounting members may comprise plural mounting members attached by flexible connectors so that the racks may be angularly positioned with respect to each other at any desired angle. In still another form, the mounting members are joined by a separate plate-like member utilizing a pair of spaced flexible connectors so that the racks attached to each other are spaced apart by the extent of the plate-like member. This particular mounting member allows the racks to be placed in parallel spaced apart arrangements to form a free-standing unit or allows the racks to be mounted by one of the mounting members to a supporting surface while allowing another one of the racks to be moved or rotated with respect to the other rack. In still another form, a plurality of the mounting members are attached to a cube forming a corner member such that a plurality of racks may be joined together to form a cubic structure.

BRIEF DESCRIPTION OF THE DRAWINGS

For a better understanding of the present invention, reference may be had to the following detailed description taken in conjunction with the accompanying drawings in which:

FIGS. 9A, 9B, and 9C are perspective, top, and edge views of a mounting member for use with the storage racks of the present invention;

FIGS. 10A, 10B, and 10C are perspective top and edge views of a pair of hinged mounting members for interconnecting at least a pair of storage racks at selectable angular positions;

FIGS. 11A, 11B, and 11C are perspective, top, and edge views, respectively, of a further embodiment of the mounting means of FIG. 10;

FIGS. 12A and 12B are further modifications of the mounting means of FIG. 9 illustrating one form of mounting means for creating a cubic structure of storage racks; and FIG. 13 is a perspective view of a pair of corner members used in forming inventive storage racks connected together by the mounting means of FIG. 10.

DETAILED DESCRIPTION OF THE INVENTION

Figure 1:
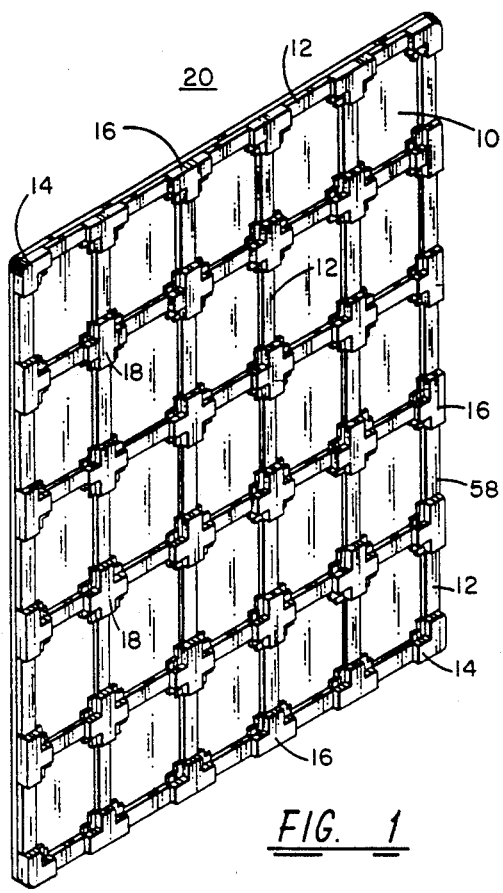
FIGS. 1 and 2 are alternate arrangements of a storage rack in accordance with the present invention.
Figure 2:
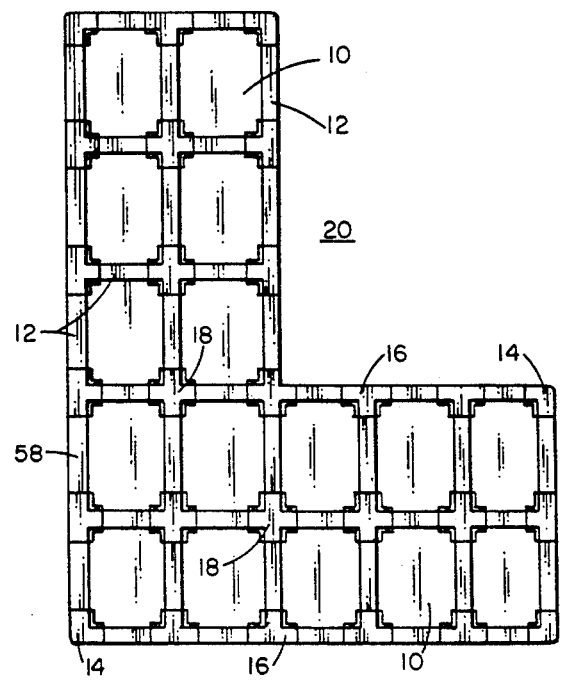

Referring now to FIGS. 1 and 2, there are shown two arrangements of the apparatus of the present invention for storage of music media such as, for example, compacts disks or CD's. FIG. 1 illustrates a rectangular arrangement of receptacles 10 while FIG. 2 represents an L-shaped arrangement of receptacles 10. Each receptacle 10 is defined by four elongated members 12 releasible coupled together by four corner members, such as, for example, corner members 14 and 18, and two corner members 16 in the upper left hand receptacles of FIG. 1. Corner members comprising a right angle or L-shape are designated 14 throughout this description, corner members comprising a T-shape are designated 16 while corner members comprising a cross-shape are designated 18. Only these three corner member shapes are needed to construct various different arrangements of storage racks 20, such as the illustrated rectangular and L-shaped arrangements. It will be appreciated that the three corner members also allow construction of U-shaped, T-shaped, and cross-shaped racks as well as other shapes. The assembled racks may also include a backing sheet or poster which can provide filler material for empty receptacles. The manner of attaching such backing sheets will be explained hereinafter.

Figure 3A:
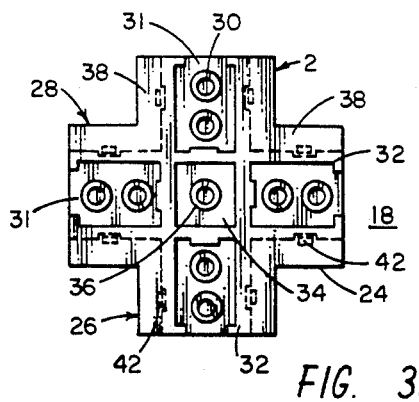
FIGS. 3A, 3B, and 3C are bottom, top, and edge views of one form of corner member for assembling the racks of FIGS. 1 and 2.
Figure 3B:
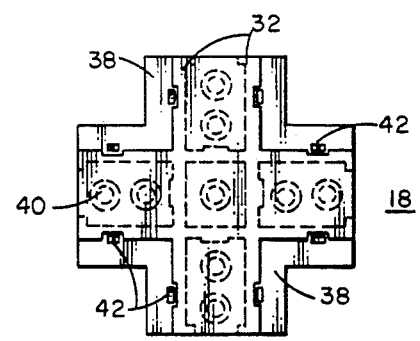
Figure 3C:
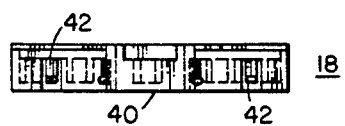

Turning to FIGS. 3A, 3B, and 3C, there are shown bottom, top, and edge views, respectively, of one of the corner members 18. It will be appreciated that the corner members 14 and 16 are modifications of the member 18. In particular, corner member 14 is essentially formed by deleting the two arms 22 and 24 from member 18 while corner member 16 can be formed by deleting only the arm 22. Each of the arms 22, 24, 26, and 28 of member 18 includes a pair of hollow, cylindrical studs 30 recessed within a hollowed out portion 31 of each arm. Walls 32 extending along each edge of each arm 22-28 also extend through the mid-portion of each corner member and thereby define a further hollowed out center portion 34. Another hollow, cylindrical stud 36 is formed within the portion 34. The stud 36 is provided for receiving a mating pin (see FIG. 8) which can be used to attach a backing or poster to the assembled storage rack.

Each of the walls 32 are formed integrally with outwardly extending flanges 38. The height of the walls 32 above the flanges 38 (see FIGS. 3B and 3C) is such as to allow a media case, such as a CD case, to be placed in one of the receptacles 10 with a bottom surface of the case resting against the flange 38 while the top or outer surface of the media case is slightly below the outer surface 40 of member 18 so that releasable latching means 42 are effective to engage the media case and restrain it within the receptacle 10. While the latching means 42 are shown as comprising two members at each corner of a media case, it will be appreciated that fewer means 42 could be used. The latching means 42 preferably are formed integrally with the corner members and in the preferred form of injection molding of the members 22-28 from plastic, the spring-like latching means 42 are molded in situ with the corner members in a manner well known in the art.

Figure 4A:
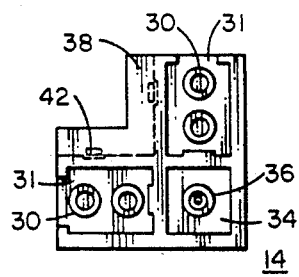
FIGS. 4A, 4B, and 4C are bottom, top, and edge views of another form of corner member.
Figure 4B:
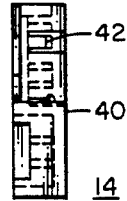
Figure 4C:
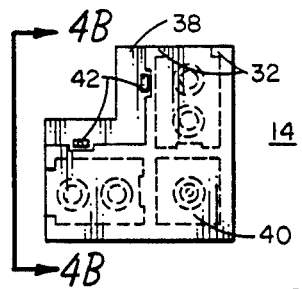
Figure 5A:
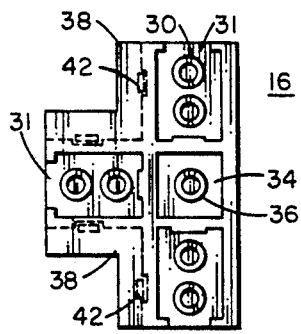
FIGS. 5A and 5B ar bottom and top views of still another form of corner member.
Figure 5B:
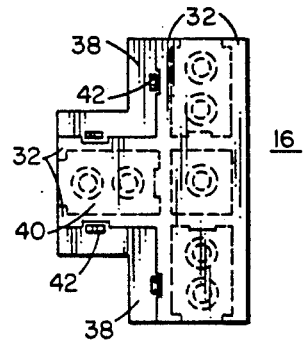

Turning now to FIGS. 4A, 4B, and 4C, there are shown bottom, edge, and top views, respectively, of a corner member 14. It will be seen that the general structure of member 14 is the same as member 18. The primary difference is in the removal of two of the arms of the member 18 so that corner member 14 forms a right-angle terminating corner. The flange segments 38 are preferably omitted from the outer portion of the member 14 since they are not needed for supporting a media case. FIGS. 5A and 5B are bottom and top views of the corner member 16 and also show the commonality of part structure with member 18.

Figure 6A:
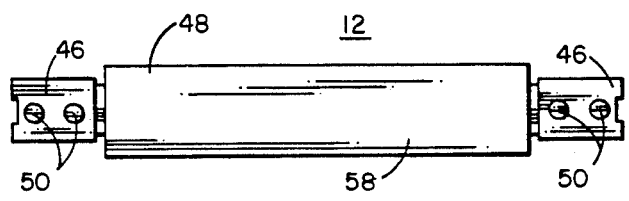
FIGS. 6A, 6B, and 6C are top, edge, and bottom views of an elongated member for joining the corner members.
Figure 6B:
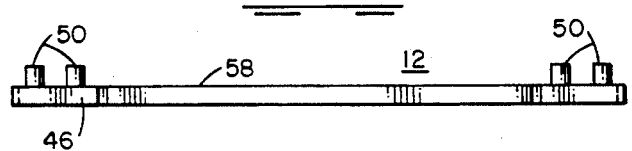
Figure 6C:
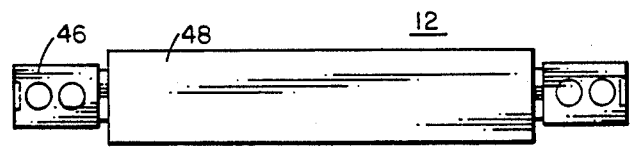

Referring now to FIGS. 6A, 6B, and 6C, there are shown top, edge, and bottom views, respectively, of the elongated members 12. Each member 12 has an end section 46 at each end thereof which fits relatively snugly within the hollowed out portion 31 of each corner member 14, 16, and 18. The major extent 48 of each member 12 is larger than an end section 46 and is sized to mate with and form a continuous surface with walls 32 of each corner member. Each end section 46 also includes a pair of spaced pins 50 adapted for press fit insertion into studs 30 to thereby releasible attach elongated members 12 to selected arms of a corner member for forming receptacles 10.

Figure 7:
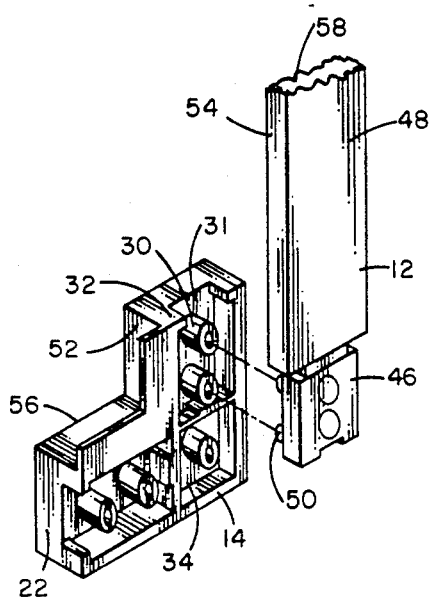
FIG. 7 is an exploded view of a corner joint.

FIG. 7 is an exploded view of a corner member 14 and one end 46 of an elongated member 12. The two members are assembled by pressing end section 46 of member 12 into the hollowed out portion 31 of corner member 14 such that pins 50 are pressed into studs 30. In their assembled orientation, the edge 52 of wall 32 forms a continuous surface with edge 54 of portion 48 of member 12. Similarly, the outer surface 56 of arm 22 forms a continuous surface with outer surface 58 of portion 48. When assembled, the center portion 34 of each corner member remains exposed toward the rear of the storage rack so that the aforementioned pins can be inserted in studs 36.

Figure 8:
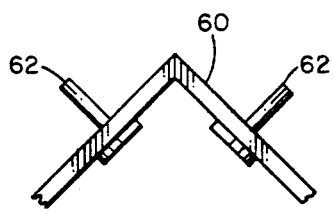
FIG. 8 illustrates apparatus for joining multiple storage racks.

FIG. 8 illustrates a right angle connector 60 which can be used to join two assembled storage racks 20 so that they become stable and stand-alone devices. The pins 62 are representative of pins for insertion in studs 36 for joining two or more racks.

In some usage, it is anticipated that the storage racks 20 may be utilized as wall hangings, particularly when the racks are used for CD storage.

In addition to the advantages set forth above for the inventive music case display rack, Applicant has invented a unique mounting system for attaching such racks to flat surfaces, such as walls, or for creating three dimensional assemblies of such racks for display on tables and stands. As described above, each of the corner members 14, 16, and 18 forming the racks 20 include receptacles or studs 30 in a rear surface thereof. Applicant has developed a mounting member which allows a rack 20 to be releasible attached to a wall surface using the studs 30. Referring now to FIGS. 9A, 9B, and 9C, there is shown a perspective view, a top view, and an edge view of a mounting member 70 which can be used to releasible connect rack 20 to a wall surface. The member 70 includes a plate-like portion 72 having a front surface 74 and a rear surface 76. A protrusion 78 substantially identical to the pins 50, extends from the front surface 74. The rear surface 76 is substantially flat so that it can be glued or otherwise fastened to a generally flat wall surface. It will be apparent that by properly positioning the members 70 on a wall surface, the rack 20 ca be releasible mounted to the wall surface by pressing the rack 20 onto the members 70. The protrusion 78 will engage the studs 30 in the rack 20 and serve to support the rack on the wall surface but in a position where it can be removed by simply pulling the rack forward to separate the studs 30 and protrusions 78.

FIG. 9C illustrates a back-to-back connection of a pair of the members 70 to form a unit having an extrusion 78 extending in opposite directions. This arrangement allows a pair of the racks 20 to be connected in a back-to-back arrangement.

Turning now to FIGS. 10A, 10B, and 10C, there is shown a pair of the members 70 which have been molded conjointly so that they are interconnected by a deformable plastic section 80. The flexibility of the plastic section 80 allows the pair of members 70 to be angularly oriented with respect to each other. It will be appreciated that when a rack 20 is connected to the member 70 along an edge of the rack 20, the racks may be similarly positioned at any desired angular orientation with respect to each other so as to form a free-standing unit. Obviously, more than two such racks could be joined together using multiple connectors of the type shown in FIG. 10 and the racks could be arranged to form a cubic structure by interconnecting the racks along more than one of their edges.

A further modification of the connective mount of FIG. 10A is illustrated in FIGS. 11A, 11B, and 11C. In the embodiment of FIGS. 11, there is included a separate plate-like portion 82 between two of the members 70. At each end of the plate-like portion 82, there is provided a flexible joint 84 allowing each of the members 70 to be flexed with respect to the member 82. The tri-part mounting assembly 86 of FIG. 10A has several unusual advantages. One such advantage is the ability to mount two racks in a back-to-back arrangement which are spaced apart by the extent of member 82. This allows the back-to-back members to be essentially free-standing. Another advantage is that the racks attached to the member 86 can be mounted to a wall surface or other supporting surface using adhesive applied to a rear surface of one of the members 70. The remaining members 70 may be left free to hinge or revolve with respect to the mounted member 70. This arrangement provides a wall rack assembly in which multiple racks may be connected and only supported at one point so that they may be swung out away from the wall for viewing the cassette cases mounted in others of the racks. Such an arrangement minimizes the amount of wall space necessary to support a plurality of CD cases by allowing the cases to be essentially stacked in multiple racks in which each of the racks can be individually rotated to view the cases in each one.

A still further modification of the mounting arrangement described above can be had by attaching the members 70 to various surfaces of a cube such as is shown in FIGS. 12A and 12B. In this arrangement, it will be noted that the individual members 70 have been attached or adhesively bonded to the six sides of a cube 90 to form a corner element which may be used to attach multiple ones of the racks 20. For any particular arrangement of mounting, all of the six sides may not be required. For example, to form a corner of a cube, only three of the members 70 would be required. However, it will be apparent that many other combinations can be designed using the mounting member illustrated in FIGS. 12.

Referring now to FIG. 13, there is shown a pair of corner members 16 which are joined together by a hinge assembly of the type shown in FIG. 10. Note that the hinge assemblies allow the two corner members to be attached while at the same time permitting the corner members to be angularly positioned one with respect to the other so as to form a free-standing structure.

What has been described is a storage rack assembly for music media which may be supplied as a kit of corner members and elongated members for assembly by a consumer in any of multiple configurations and sizes. While one form of releasable connection has been illustrated for joining the elongated members to the corner members, other forms will become apparent to those skilled in the art. Furthermore, the members forming each receptacle may be molded in other configurations, such as, for example, as individual or multiple receptacles 10 adapted for joining with other receptacles. The rack may be wall mounted using the inventive mounting means 70 or may be joined in three-dimensional arrangements using the illustrative modifications of means 70. It is intended therefore that the invention not be limited to the illustrative embodiment but be interpreted within the full spirit and scope of the appended claims.

What is claimed is:

1. A wall mountable storage rack for compact disk cases comprising an open framework forming a plurality of adjacent rectangular receptacles being sized to accept a compact disk case when the case is oriented with one of the disk case's largest surfaces facing outward of the rack, each of the rectangular receptacles being formed from four elongated side members releasibly joined to four corner members, preselected ones of the corner members being connectable to other elongated side members for forming the adjacent receptacles;.

each of said corner members including a flange adjacent a rear edge thereof, said flange extending a preselected distance into a receptacle defined in part by a corresponding one of said corner members, said flange engaging a rear surface of said compact disk case when the disk case is inserted into a receptacle for positioning an outwardly facing surface of the case in a preselected orientation with respect to an outwardly facing surface of the storage rack, each of said corner members further including a receptacle on a rear surface thereof; and means for mounting said rack to a generally flat surface, said mounting means comprising a first plate-like member having a front and a rear surface and a protrusion extending from said front surface, said protrusion being adapted for releasable engagement with one of said receptacles, and fastening means associated with said rear surface of said mounting means for attaching said mounting means to said generally flat surface for supporting said rack thereon.

2. The storage rack of claim 1 further comprising a second plate-like member rotatably hinged to said first plate-like member, said second plate-like member having a protrusion extending from a front surface thereof in substantially the same direction as said protrusion from said first plate-like member such that a second storage rack may be attached to said second plate-like member for relative angular positioning with respect to a rack attached to said first plate-like member.

3. The storage rack of claim 2 wherein said second plate-like member is attached to said first plate-like member by a third plate-like member and a relatively flexible joint is established between each of said plate-like members.

4. The storage rack of claim 2 wherein at least said second member includes a protrusion extending from said rear surface thereof for connection to another of said racks for forming a back-to-back connection between at least two of said racks, said at least one of said racks being selectively angularly positioned with respect to a rack connected to said first member.

5. The storage rack of claim 1 and including a cube and a plurality of said mounting means, each of said mounting means being attached to a corresponding surface of said cube such that said cube defines a corner member for attaching a plurality of said racks to form a cubic structure of said storage racks.

6. Apparatus for forming a storage rack for music media cases comprising a plurality of elongated members and a plurality of corner members forming a plurality of adjacent rectangular receptacles for receiving the media cases, the elongated members having preselected lengths for establishing preselected sizes of receptacles corresponding to sizes of media cases to be displayed in the rack, the receptacles being formed so as to establish a generally planar rack for displaying the media cases with a larger surface of the cases facing outward of the rack, at least some of the corner members including a hollow stud formed on a rear surface thereof, and mounting means comprising a first plate-like member having a generally flat rear surface and a protrusion extending from a front surface thereof, said protrusion being adapted to frictionally engage said stud for releasable attachment to said storage rack, the rear surface of said mounting means being attachable to a generally flat supporting surface for supporting said rack.

7. The apparatus of claim 6 wherein said mounting means further comprises a second plate-like member flexibly hinged to said first plate-like member, said second plate-like member including a second protrusion extending from a front surface thereof for attachment to another storage rack for allowing said racks to be angularly positioned with respect to each other.

8. The apparatus of claim 7 wherein said hinged connection between said first and second members comprises a third plate-like member, each of said first and second members being angularly positionable with respect to said third member.

9. The apparatus of claim 8 wherein at least said second member includes a protrusion extending from said rear surface thereof for connection to another of said racks for forming a back-to-back connection between at least two of said racks, said at least two of said racks being selectively angularly positionable with respect to a rack connected to said first member.

10. The apparatus of claim 9 wherein each of the corner members includes a flange portion extending into a corresponding receptacle for supporting a rear surface of a respective media case, and means associated with each of the receptacles for releasibly retaining a corresponding media case into a seating position against a corresponding one of the flange portions.

11. A wall mountable storage rack for compact disk cases comprising an open framework forming a plurality of adjacent rectangular receptacles being sized to accept a compact disk case when the case is oriented with one of the disk case's largest surfaces facing outward of the rack, each of the rectangular receptacles being formed from four elongated side members releasibly joined to four corner members, preselected ones of the corner members being connectable to other elongated side members for forming the adjacent receptacles;

each of said corner members including a flange adjacent a rear edge thereof, said flange extending a preselected distance into a receptacle defined in part by a corresponding one of said corner members, said flange engaging a rear surface of a compact disk case when the disk case is inserted into a receptacle for positioning an outwardly facing surface of the case in a preselected orientation with respect to an outwardly facing surface of the storage rack;

means in each of the receptacles for releasibly retaining a disk case within the receptacle in an abutting position against said flange; and mounting means releasibly connectable to a rear surface of said storage rack.

* * * * *